United States Patent [19]
Correia

[11] Patent Number: 5,738,020
[45] Date of Patent: Apr. 14, 1998

[54] LOCK BOX AND MOUNTING DEVICE

[76] Inventor: Lewis A. Correia, 513 S. Nevada St., Oceanside, Calif. 92054

[21] Appl. No.: 526,947

[22] Filed: Sep. 12, 1995

[51] Int. Cl.$^6$ ..................................... E05G 1/04
[52] U.S. Cl. ..................... 109/51; 248/222.41; 248/551
[58] Field of Search .......................... 248/551, 552, 248/553, 223.21, 222.41; 109/51, 52

[56] References Cited

U.S. PATENT DOCUMENTS

| | | | |
|---|---|---|---|
| 7,101 | 2/1850 | Hochstrasset | 109/51 |
| 1,634,884 | 7/1927 | Peer | 109/51 |
| 1,718,249 | 6/1929 | Morin | 109/51 |
| 4,858,878 | 8/1989 | Gassaway | 248/551 |
| 4,893,777 | 1/1990 | Gassaway | 248/551 |
| 4,938,442 | 7/1990 | Mastrodicasa | 248/222.41 X |
| 5,513,580 | 5/1996 | Franks | 109/51 |

Primary Examiner—Ramon O. Ramirez
Attorney, Agent, or Firm—Calif Kip Tervo

[57] ABSTRACT

A combination lock box and mounting device allows the lock box to be easily attached and unattached. The lock box includes a back wall having a plurality of key-hole openings therein and a lid having a closed position and an open position. The mounting device comprises a mounting bracket and a locking plate. The locking bracket is to be secured to a supporting surface and includes a plurality of flared head shafts extending through the key-holes of the lock box. The locking plate has a plurality of key-hole openings. The locking plate is inserted into the lock box to a locking position wherein the locking plate's key-holes receive the shafts of the mounting bracket and lock the lock box onto the mounting bracket. The lid, in the closed position, retains the locking plate in the locking position.

20 Claims, 3 Drawing Sheets

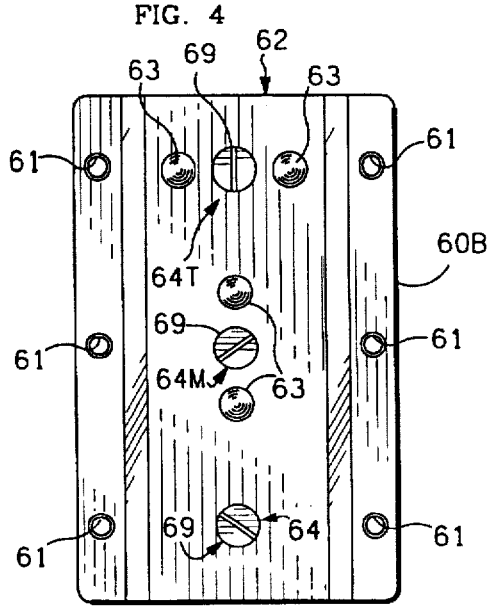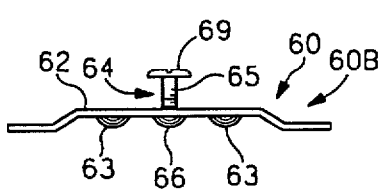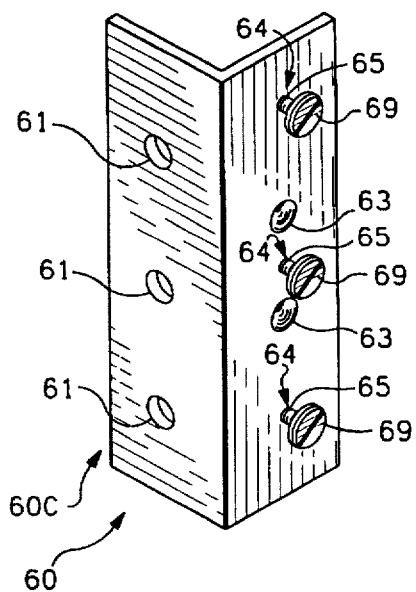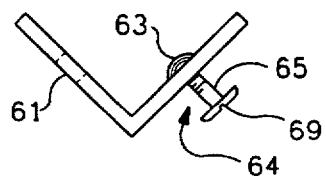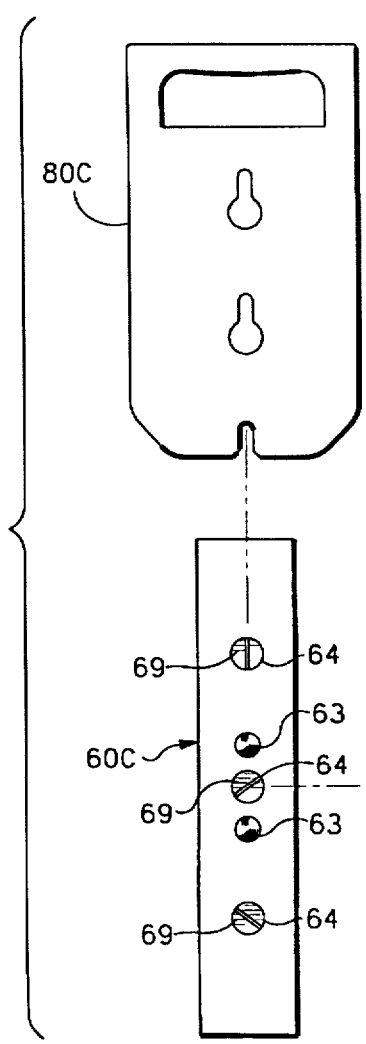

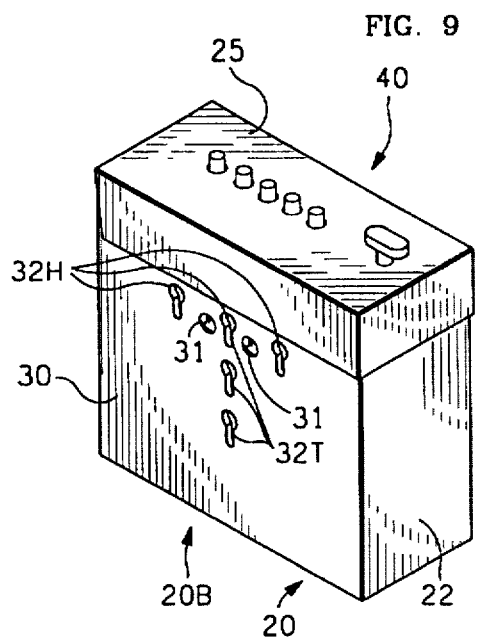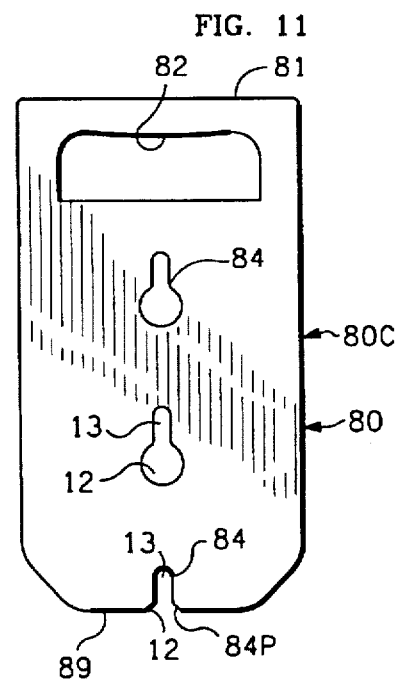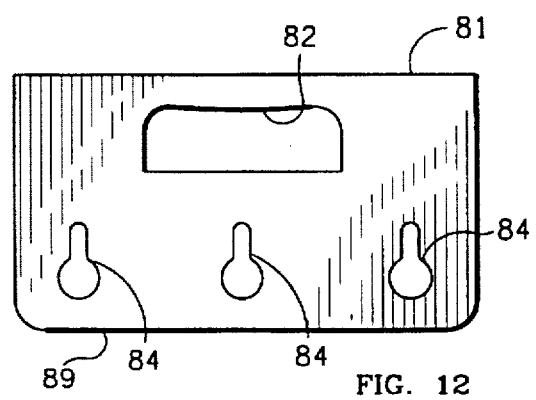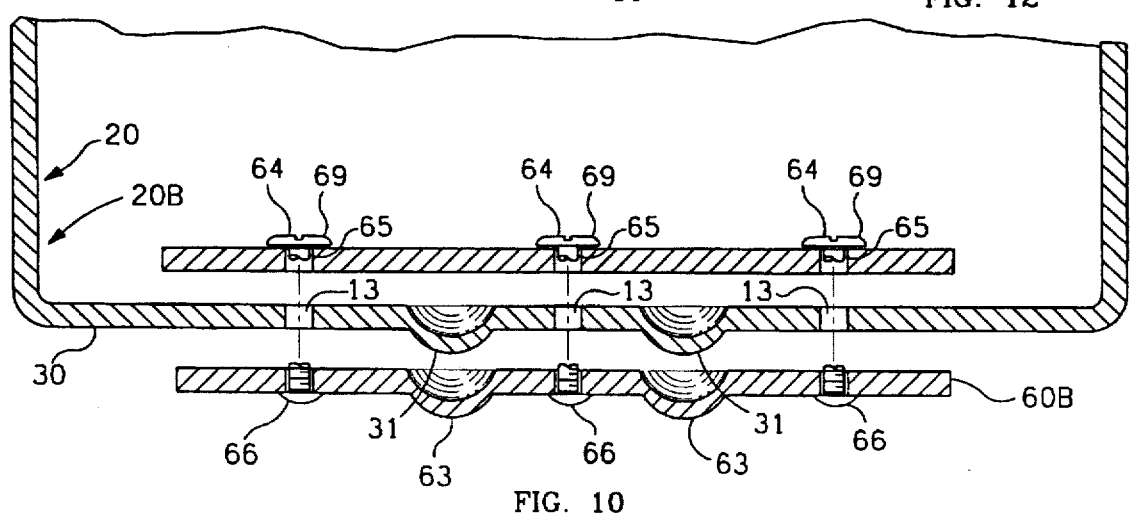

LOCK BOX AND MOUNTING DEVICE

BACKGROUND OF THE INVENTION

1. Field of the Invention

This invention relates to a lock box for protecting articles such as a gun or jewelry and more specifically to a lock box and mounting device for easily removably securing the lock box to a supporting surface.

2. Description of the Related Art

Common devices for securing articles include safes, vaults and permanently mounted containers. These devices do not allow for easy accessibility or secure movement of the secured articles.

Guns and valuables may be hidden in custom made appliances such as clocks and picture frames. These devices permit easy accessibility but not theft or security from unwanted hands.

SUMMARY OF THE INVENTION

This invention is a combination lock box and mounting device. The lock box includes a back wall having a plurality of key-hole openings therein and a lid having a closed position and an open position. The mounting device comprises a mounting bracket and a locking plate. The mounting bracket is to be secured to a supporting surface and includes a plurality of flared head shafts extending through the key-holes of the lock box. The locking plate has a plurality of key-hole openings. The locking plate is inserted into the lock box to a locking position wherein the locking plate's key-holes receive the shafts of the mounting bracket and lock the lock box onto the mounting bracket. The lid, in the closed position, retains the locking plate in the locking position. In a first embodiment, the box key-holes each have the slot end away from the lid and the locking plate key-holes each have the slot end toward the lid.

In a second embodiment the mounting bracket and the back wall of the lock box include inter-engaging protrusions and recesses such that, when engaged, the mounting bracket and the back wall cannot slide relative to the other.

A particular function of this invention is to provide the owner of a handgun a secured container to legally and safely store and transport a weapon. The lock box of the invention is easily removable attached to a secure surface.

Other features and many attendant advantages of the invention will become more apparent upon a reading of the following detailed description together with the drawings in which like reference numerals refer to like parts throughout.

BRIEF DESCRIPTION OF THE DRAWINGS

FIG. 4 is a top plan view of a second embodiment of a mounting bracket of the invention.

FIG. 5 is a end elevation view of the mounting bracket of FIG. 4.

FIG. 6 is a perspective view of a third embodiment of mounting bracket.

FIG. 7 is an end view of the mounting bracket of FIG. 6.

FIG. 8 is a top plan view of the mounting bracket of FIG. 6 and top plan views of second and third embodiments of locking plates.

FIG. 9 is a rear perspective view of an second embodiment of lock box.

FIG. 10 is an exploded sectional view, partially cut away, of the lock box of FIG. 9 mounted on the mounting bracket of FIG. 4 or FIG. 6.

FIG. 11 is an enlarged top plan view of the second embodiment of locking plate of FIG. 8.

FIG. 12 is an enlarged top plan view of the third embodiment of locking plate of FIG. 8.

DETAILED DESCRIPTION OF THE INVENTION

Figure 1:
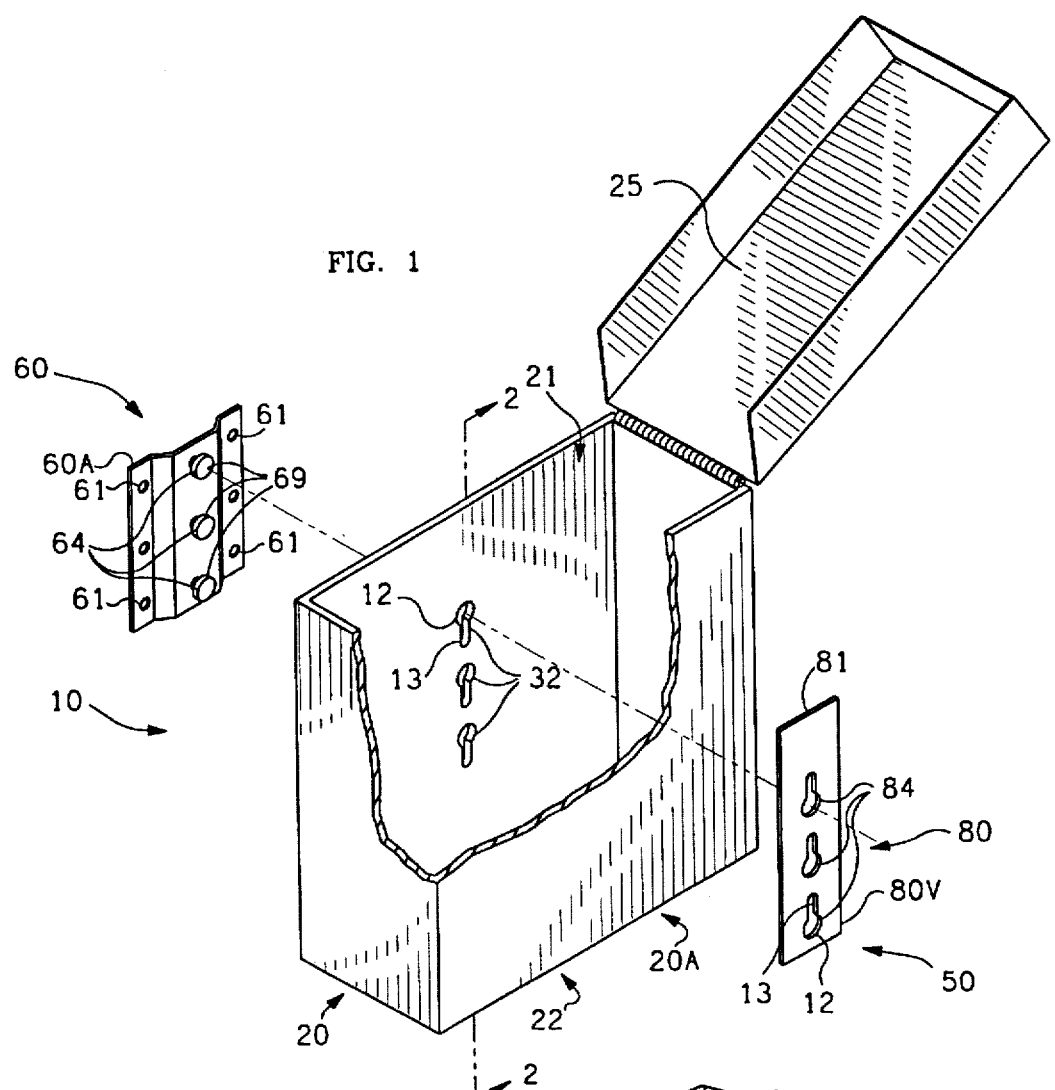
FIG. 1 is an exploded perspective view, partially cut away, of a first embodiment of the lock box and mounting device of the invention.
Figure 2:
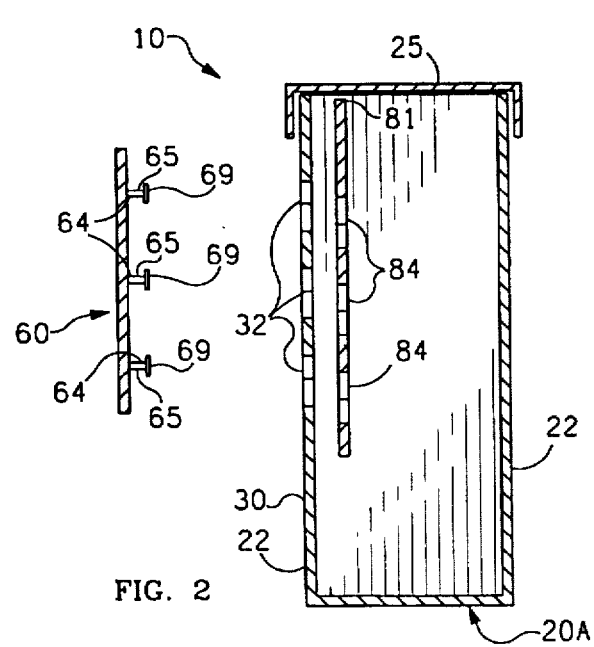
FIG. 2 is an exploded cross-sectional view of the embodiment of FIG. 1 in the mounted and locked position.
Figure 3:
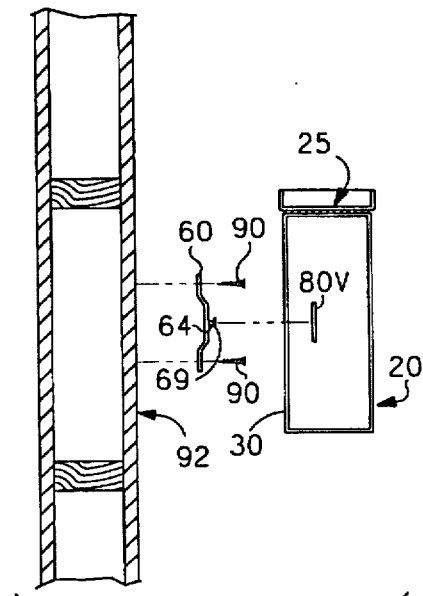
FIG. 3 is a top plan view of FIG. 2.

FIGS. 1–3 show a first embodiment of invention 10. FIG. 1 is an exploded perspective view, partially cut away, of the first embodiment of a lock box 20, such as lock box 20A, and mounting device 50 of the invention 10. FIG. 2 is an exploded cross-sectional view of the embodiment of FIG. 1 in the mounted and locked position. FIG. 3 is a top plan view of FIG. 2.

Lock box 20A generally includes walls 22 defining a closed cavity 21. At least one wall 22, such as lid 25, is movable between an open position, shown, and a closed position enclosing cavity 21. Lid 25 may be locked in the closed position by any suitable locking device as is well known in the art. Back wall 30 has a plurality of key-hole openings 32 therein. A key-hole opening has an entry end 12 and a slot end 13. Preferably, each key-hole opening 32 of back wall 30 of lock box 20A has the slot end 13 away from lid 25 when lid 25 is closed. Key-holes 32 in lock box 20A are arranged in a vertical line.

Mounting device 50 generally comprises a mounting bracket 60, such as planar mounting bracket 60A, and a mounting plate 80, such as vertical mounting plate 80V. Mounting bracket 60A includes attachment holes 61 for receiving fasteners, such as screws 90 for securing mounting bracket 60A to a planar supporting surface, such as wall 92. Mounting bracket 60A includes a plurality of projections 64 extending perpendicularly therefrom. Each projection 64 includes as shaft 65 with an enlargement on top, such as flared head 69. Locking plate 80V is a flat plate having a handle end 81, an insertion end 89 and a plurality of key-hole openings 84 therethrough. Preferably, key-holes 84 of locking plate 80 each has the slot 13 toward handle end 81.

Lock box 20A is mounted on a secured mounting bracket 60A by first placing flared heads 69 and shafts 65 through entry end 12 of key-holes 32 in back wall 30 and then moving box 20A such that shafts 65 are disposed through slot end 13 of key-holes 32; then, by inserting locking plate 80, insertion end 89 first, into cavity 21 of said lock box 20A such that slot ends 13 of key-holes 84 are toward lid 25 in the closed position, placing flared heads 69 and shafts 64 through entry end 12 of key-holes 84 in locking plate 80 and then moving locking plate 80 such that shafts 65 are disposed through slot end 13 of key-holes 84. Shafts 65 are now disposed through slot ends 13 of both box 20A and locking plate 80 and, preferably are completely surrounded. As best seen in FIG. 3, lid 25, in the closed position, contacts handle end 81 and retains locking plate 80 in this locking position wherein box 20A cannot move.

Turning now to FIGS. 4 and 5, FIG. 4 is a top plan view of an alternate mounting bracket 60, such as dimpled planar mounting bracket 60B. FIG. 5 is a end elevation view of mounting bracket 60B of FIG. 4. Mounting bracket 60B is similar to mounting bracket 60A above in that it is rectangular in shape and made of steel. A powder coating is applied to outer surface of mounting brackets 60 for appearance and durability. The plurality of attachment holes 61 accept fasteners, such as screws, to attach mounting bracket 60B to a wall or other desired surface. Raised center portion or bight 62 allows clearance for closed lid 25 of lock box 20A and clearance space for a weld on the lower end 66 of each shaft 64. Bight 62 also allows easier attachment of lock box 20A and locking plate 80. A plurality of projections 64, having predetermined spacing and each including a shaft 65 and a flared head 69, extend perpendicularly upward from bight 20A. Flared heads 69, for inserting into key-holes 32 of box 20A and into key-holes 84 of locking plate 80, are of height above bight 62 equal to the combined thickness of back wall 30 of lock box 20A and locking plate 80. Mounting bracket 60B further includes a plurality of recesses, such as holes or dimples 63, each for receiving a mating protrusion 31, shown in FIG. 9, from lock box 20A for preventing lock box 20A from moving out of position or from shifting relative to mounting bracket 60B. Dimples 63 are on both sides of top projection 64T and of middle projection 64M.

FIGS. 6, 7, and 8 show an alternate embodiment of mounting bracket 60, such as dimpled angle mounting bracket 60C. FIG. 6 is a perspective view of angle mounting bracket 60C. FIG. 7 is an end view and figure is a top plan view. Angle mounting bracket 60C is similar in function to planar brackets 60A,60B described above except has a ninety degree shape defining two legs. One leg includes attachment holes 61 for fastening angle mounting bracket 60 to a counter, bed frame or angled surface. The outer side of the other leg includes projections 64 and dimples 63.

FIG. 9 is a rear perspective view of an alternate embodiment of lock box 20, such as lock box 20B. Lock box 20B is similar to lock box 20A described above and differs as described below. Lid locking means, such as a key lock or push button combination lock 40, is included in lid 25 and deters entrance to lock box 20B thereby securing locking plate 80 and valuables inside. Lock box 20B includes protrusions 31 for engaging dimples 63 in mounting bracket 60. Key-holes 32 in back wall 32 are arranged in a T configuration; with three key-holes 32V comprising the vertical portion and three key-holes 32H comprising the horizontal portion; the spacing between adjacent entry ends 12 being equal.

FIG. 10 is an exploded sectional view, partially cut away, of lock box 20B of FIG. 9 mounted on mounting bracket 60B of FIG. 4. Shafts 65 fit in slot ends 13 of key-holes 32. Flared heads 69 prevent removal. Bracket dimples 63 and box protrusions 61 inter-engage such that lock box 20 and mounting bracket 60B cannot move laterally, i.e. shift or move side to side, relative to each other. Thus, with protrusions 61 and dimples 63 engaged, locking plate 80 need only hold them engaged and need not otherwise prevent movement.

FIG. 11 shows a top plan view of a second embodiment of locking plate 80, such cut-off vertical locking plate 80C shown in relative position for attachment to angle mounting bracket 60C. Cut-off locking plate 80C locks a lock box 20, such as lock box 20B in a vertical position to a mounting bracket 60 by engaging projections 64 placed through vertical key-holes 32T. Cut-off locking plate 80C is similar to vertical locking plate 80V of FIG. 1 in that it is preferably composed of a steel plate with a powder coating on its outer surface and includes a plurality of key-holes 84 vertically down the center. Key-holes 84 are spaced to accept projections 64 of mounting brackets 60. Cut-off vertical locking plate 80C differs in that insertion end 89 is truncated such that the bottom key-hole 84 is a partial key-hole 84P including a slot end 13 and a portion of entry end 12. Partial entry end 12 of partial key-hole 84P provides a lead-in notch for the corresponding shaft 65 on mounting bracket 60. This helps support and align the remaining key-holes 84 when locking plate 80C is inserted into cavity 21 of lock box. Also, locking plate 80C further includes on handle end 81 a handle opening constituting a handle 82. Handle 82 is used for easy grasping of locking plate 80C to engage or disengage locking plate 80C from projections 64 of mounting bracket 60 within lock box 20B. Locked lid 25 engages handle end 81 such that locking plate 80C cannot further move.

FIG. 12 shows a top plan view of another alternate embodiment of locking plate 80, such as horizontal locking plate 80H shown in relative position for attachment to angle mounting bracket 60C. Horizontal locking plate 80H locks a lock box 20, such as lock box 20B in a horizontal position such as under a counter, metal bed frame or angles surface to a mounting bracket 60. Horizontal locking plate 80H is similar to vertical locking plate 80V of FIG. 1 in that it is preferably composed of a steel plate with a powder coating on its outer surface. Horizontal locking plate 80H differs in that its plurality of key-holes 84 are horizontal for engaging projections 64 placed through horizontal key-holes. Key-holes 84 are spaced to accept projections 64 of mounting brackets 60. Also, locking plate 80H further includes on handle end 81 a handle opening constituting a handle 82. Handle 82 is used for easy grasping of locking plate 80H to engage or disengage locking plate 80H from projections 64 of mounting bracket 60 within lock box 20B. Locked lid 25 engages handle end 81 such that locking plate 80H cannot further move.

Having described the invention, it can be seen that mounting device 50 prevents removal of lock box 20 and protects and secures the articles inside. Mounting device 50 provides quick and easily mobility by enabling lock box 20 to be secured in one place and easily detached for movement to other locations, such as business, home, truck, recreational vehicle, boat, car or the like, where it can be re-attached to another mounting bracket 60. Lock box 20 can be mounted in either vertical or horizontal positions.

Although particular embodiments of the invention have been illustrated and described, various changes may be made in the form, composition, construction, and arrangement of the parts without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. In combination:

a lock box defining a closed cavity and having an opening on its back wall; and a mounting device comprising:

a mounting bracket to be secured to a supporting surface; said mounting bracket including:

a shaft extending from said mounting bracket and through said opening of said lock box; and a locking plate inserted into said cavity of said lock box; said locking plate having an opening to receive said shaft of said mounting bracket and locking said lock box to said mounting plate.

2. The combination of claim 1 wherein:

said opening of said lock box is a key-hole; and said opening of said locking plate is a key-hole.

3. The combination of claim 1 wherein:

said lock box includes:

a lid having a closed position and an open position; said lid in the closed position retaining said locking plate inserted into said cavity in a locked position on said shaft.

4. The combination of claim 1 wherein:

said lock box includes:

a lid having a closed position and an open position;

said opening of said lock box is a key-hole having the slot end away from said lid; and said opening of said locking plate is a key-hole; when inserted into said cavity, said locking plate key-hole having the slot end toward said lid; and said shaft includes a flared head.

5. The combination of claim 4 wherein:

said lid in the closed position retains said locking plate inserted into said cavity in a locked position on said shaft.

6. The combination of claim 1 wherein:

said mounting bracket and said back wall of said lock box include inter-engaging protrusions and recesses such that, when engaged, said bracket and said back wall cannot slide relative to the other.

7. In combination:

a lock box defining a closed cavity and having a plurality of openings on its back wall; and a mounting device comprising:

a mounting bracket to be secured to a supporting surface; said mounting bracket including:

a plurality of shafts extending from said mounting bracket and through said openings of said lock box; and a locking plate inserted into said cavity of said lock box; said locking plate having a plurality of openings to receive said shafts of said mounting bracket and locking said lock box to said mounting plate.

8. The combination of claim 7 wherein:

said openings of said lock box are key-holes; and said openings of said locking plate are key-holes.

9. The combination of claim 7 wherein:

said shafts each include a flared head.

10. The combination of claim 7 wherein:

said openings of said lock box are key-holes;

said openings of said locking plate are key-holes; and said shafts each include a flared head.

11. The combination of claim 7 wherein:

said lock box includes:

a lid having a closed position and an open position; said lid in the closed position retaining said locking plate inserted into said cavity in a locked position on said shafts.

12. The combination of claim 7 wherein:

said lock box includes:

a lid having a closed position and an open position;

said openings of said lock box are key-holes, each having the slot end away from said lid; and said openings of said locking plate are key-holes; when said locking plate is inserted into said cavity, each said locking plate key-hole having the slot end toward said lid; and said shafts each include a flared head.

13. The combination of claim 12 wherein:

said lid in the closed position retains said locking plate inserted into said cavity in a locked position on said shafts.

14. The combination of claim 7 wherein:

said mounting bracket and said back wall of said lock box include inter-engaging protrusions and recesses such that, when engaged, said bracket and said back wall cannot slide relative to the other.

15. In combination:

a lock box defining a closed cavity; said lock box including:

a back wall having a plurality of openings therein; and a lid having a closed position and an open position; a mounting device comprising:

a mounting bracket to be secured to a supporting surface and including a plurality of shafts extending from said mounting bracket and through said openings of said lock box; and a locking plate having a plurality of openings, said locking plate, in a locking position, inserted into said cavity of said lock box such that said plurality of openings in said locking plate receive said shafts of said mounting bracket and lock said lock box onto said mounting bracket; said lid in the closed position retaining said locking plate in the locking position.

16. The combination of claim 15 wherein:

said openings of said lock box are key-holes; and said openings of said locking plate are key-holes.

17. The combination of claim 15 wherein:

said shafts each include a flared head.

18. The combination of claim 17 wherein:

said openings of said lock box are key-holes;

said openings of said locking plate are key-holes; and said shafts each include a flared head.

19. The combination of claim 15 wherein:

said openings of said lock box are key-holes, each having the slot end away from said lid; and said openings of said locking plate are key-holes, each having the slot end toward said lid; and said shafts each include a flared head.

20. The combination of claim 15 wherein:

said mounting bracket and said back wall of said lock box include inter-engaging protrusions and recesses such that, when engaged, said bracket and said back wall cannot slide relative to the other.

* * * * *